United States Patent
Jankovic

(10) Patent No.: US 7,213,566 B1
(45) Date of Patent: May 8, 2007

(54) ENGINE SYSTEM AND METHOD OF CONTROL

(75) Inventor: Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/463,869

(22) Filed: Aug. 10, 2006

(51) Int. Cl.
*F02B 11/00* (2006.01)
(52) U.S. Cl. .................. 123/302; 123/305
(58) Field of Classification Search .. 123/90.15–90.18, 123/302, 305, 294
See application file for complete search history.

(56) References Cited

U.S. PATENT DOCUMENTS

| | | | |
|---|---|---|---|
| 5,036,668 A | 8/1991 | Hardy | |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,336,436 B1 | 1/2002 | Miyakubo et al. | |
| 6,390,054 B1 | 5/2002 | Yang | |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,923,167 B2 | 8/2005 | Flowers | |
| 6,932,175 B2 | 8/2005 | Teraji et al. | |
| 2004/0065279 A1 | 4/2004 | Hitomi et al. | |
| 2004/0182359 A1 | 9/2004 | Stewart et al. | |
| 2005/0121008 A1 | 6/2005 | Kilkenny et al. | |
| 2005/0173169 A1 | 8/2005 | Gray, Jr. | |
| 2005/0183693 A1 | 8/2005 | Yang et al. | |

OTHER PUBLICATIONS

Lang, et al., "Thermodynamical and Mechanical Approach Towards a Variable Valve Train for the Controlled Auto Ignition Combustion Process," SAE Technical Paper Series, Apr. 11-14, 2005, Paper Series No. 2005-01-0762, SAE International, Warrentown, Pennsylvania, United States.

*Primary Examiner*—Erick Solis
(74) *Attorney, Agent, or Firm*—Allan J. Lippa; Alleman Hall McCoy Russell Tuttle, LLP

(57) ABSTRACT

A method of operating an engine having a hotter and colder airstreams separately controlled to a cylinder is provided. The method controls valve timing during a transition in operating modes to provide improved operation.

21 Claims, 8 Drawing Sheets

ENGINE SYSTEM AND METHOD OF CONTROL

FIELD

The present application relates to systems and methods for control of intake air during mode transitions with an internal combustion engine.

BACKGROUND AND SUMMARY

Internal combustion engines may operate in a variety of combustion modes. One example mode is homogeneous charge compression ignition (HCCI), wherein an air and fuel mixture achieves a temperature where combustion occurs by autoignition without requiring a spark being performed by a sparking device. In some conditions, HCCI may have greater fuel efficiency and reduced NOx production compared to other combustion modes. However, combustion modes such as HCCI may be limited under some conditions, since a substantial amount of heat and pressure may be needed to produce combustion. Further, transitions into and out of the HCCI mode may present various control issues.

One approach to enable operation in a variety of combustion modes is described in U.S. 2005/0183693. In this example, a cylinder with cam profile switching is used to provide operation in both HCCI and SI combustion.

However, the inventors herein have recognized a disadvantage with such an approach. For example, during the transient conditions of SI/HCCI transitions in the above system, the cylinders may experience incorrect cylinder air amounts, residual amounts, and/or fuel charge amounts.

In one approach, the above issues may be addressed by a method of operating an engine having at least one cylinder, comprising: directing a first air stream to a first intake valve of the cylinder; directing a second, separate, air stream to a second intake valve of the cylinder, said first stream at a higher temperature than said second air stream; during a first mode, operating with said first intake valve providing more airflow than the second intake valve; varying a timing of at least one of the first and the second intake valves during the first mode when transitioning to a second mode; and during the second mode, operating with said first intake valve providing less airflow than the second intake valve, and varying a timing of at least one of the first and second intake valves after transitioning from the first mode.

In this way, in the HCCI mode of operation, the mass and temperature of air in the cylinder and the intake cam timing (e.g. the intake valve closing—IVC—angle) are varied to achieve a high or the highest possible fuel economy and/or emissions at the given engine speed and torque (e.g. as determined by the amount of fuel burned). Likewise, in the SI mode the spark timing and intake cam timing may be varied for the same purpose. To achieve smooth transients from one mode to another and reset the after treatment system if necessary, a set of operations may be performed that includes positioning the throttles and cam timing prior to the mode switch and restoring the optimal schedules appropriate for the new mode after the switch. This approach takes advantage of the relatively low sensitivity to the IVC of the amount of air trapped in the cylinder when IVC is close to TDC relative to the sensitivity when IVC is close to the middle of the compression stroke. Thus, this approach is enabled by the longer duration of the dominant (cold stream) intake valve in the SI mode compared to the valve duration (s) in the HCCI mode. By varying the valve timing of at least one of the intake valves, the absolute amount of air and/or the initial charge temperature may be rapidly varied, thereby providing improved operation when changing combustion modes. Further, by providing at least some heated air during a spark ignition mode, a ready reserve of heated air may be maintained.

Note that in the above approach, cam actuated valves may be used, where various types of cam lobes may be connectable to an intake valve. For example, a tappet may be connectable to one of a plurality of cam lobes, wherein a particular cam lobe is selected by varying the position of the cam lobe via cam profile switching. In another approach, a switchable tappet may be reconfigured to provide different contact points for selecting one of a plurality of cam lobes.

In another embodiment, the method may further include varying an amount of fuel delivered to the cylinder during the transition in response to the varied timing. In this way, it is possible to account for the variation in fuel pushback during the timing variation of the transition.

Note that various modes may be provided such as, for example, homogeneous charge compression ignition, compression ignition, homogeneous spark ignition, stratified spark ignition, and spark assisted compression ignition, among others. Further, an air stream of a higher temperature may be provided through heat addition via a heat exchanger and/or by cooling the other intake air stream to achieve a lower temperature.

DETAILED DESCRIPTION

Figure 1:
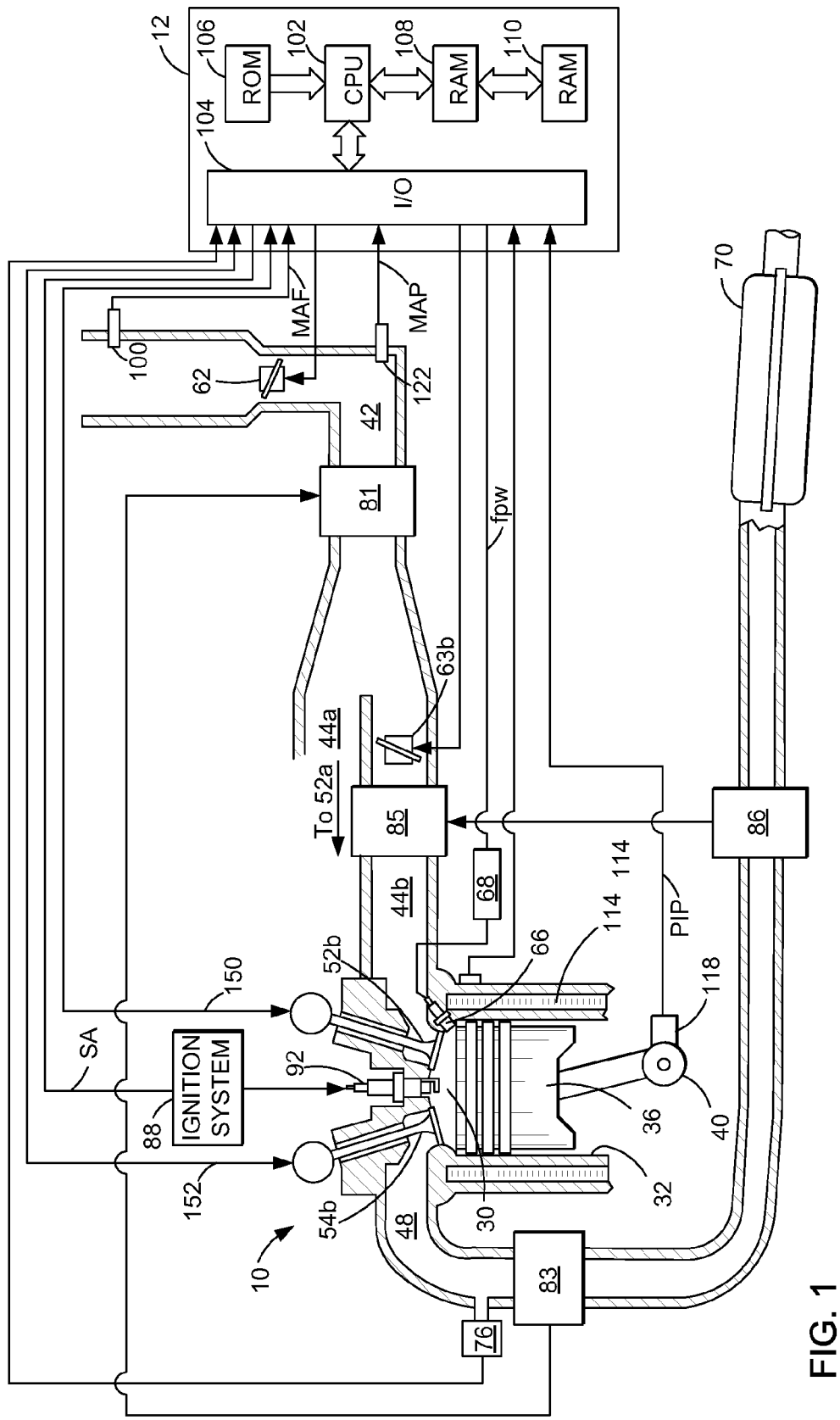
FIG. 1 shows an example engine cylinder configuration.

FIG. 1 is a schematic diagram of one cylinder of a multi-cylinder engine, as well as one of the intake and exhaust paths connected to that cylinder. A direct injection internal combustion engine 10, comprising a plurality of combustion chambers, is controlled by a control system including electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown). Combustion chamber 30 is shown communicating with intake manifold 44b and exhaust manifold 48 via respective intake valve 52b and exhaust valve 54b. Combustion chamber 30 also may communicate with intake manifold 44a and exhaust manifold 48 via respective intake valve 52a and exhaust valve 54a (shown in FIGS. 2 and 3). As will be described below in greater detail, intake air may be delivered to combustion chamber 30 via valve 52b at a higher temperature than intake air supplied via valve 52a.

Fuel injector 66 is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel may be delivered to fuel injector 66 by a conventional high pressure fuel system (not shown) including a fuel tank, fuel pumps, and a fuel rail.

Intake manifold 42 is shown communicating with main throttle 62. In this particular example, the position of throttle 62 may be varied by controller 12 via an electric motor. This configuration is commonly referred to as electronic throttle control (ETC), which may also be utilized during idle speed control.

Engine 10 may further include a compression device such as a turbocharger, including a compressor 81 arranged along intake manifold 42 and a turbine 83 arranged along exhaust manifold 48. Turbine 83 may supply mechanical work to compressor 81 via a shaft, for example.

Intake manifold 42 is shown branching into intake manifold 44b and intake manifold 44a. Intake manifold 44b may include an electronic throttle 63b as described above with reference to throttle 62. Similarly, intake manifold 44a may include an electronic throttle 63a (shown in FIG. 2). Intake manifold 44b is further shown including an intake heat exchanger 85 configured to provide thermal energy (i.e. heat) to the air flowing through intake manifold 44b. Thermal energy may be provided to heat exchanger 85 by a variety of sources. In one embodiment, as shown in FIG. 1, an exhaust heat exchanger 86 arranged in exhaust manifold 48 may provide thermal energy to heat exchanger 85. In another embodiment, thermal energy may be provided to heat exchanger 85 by hot engine coolant. In yet another embodiment, heat exchanger 85 may receive thermal energy via conversion of electrical energy to heat via an electric resistance heater. In some embodiments, the exhaust manifold may not include exhaust heat exchanger 86. It should be appreciated that in some embodiments, throttle 63b may be located downstream of heat exchanger 85, or engine 10 may not include one or more of throttles 62, 63a, and/or 63b.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under select operating modes. Though spark ignition components are shown, engine 10 (or a portion of the cylinders thereof) may be operated in a compression ignition mode, with or without spark assist, as explained in more detail below.

Emission control device 70 is shown downstream of exhaust manifold 48. Device 70 may be a three way catalyst, NOx trap, various other devices, or combinations thereof. In some embodiments, engine 10 may include a vapor recovery system enabling recovery of fuel vapors from a fuel tank and/or fuel vapor storage canister via purge control valve to at least one of intake manifolds 44a and 44b.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100; engine coolant temperature (ECT) from temperature sensor 112 coupled to cooling sleeve 114; a profile ignition pickup signal (PIP) from Hall effect (or other type) sensor 118 coupled to crankshaft 40; throttle position from a throttle position sensor; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft. Controller 12 may be further configured to control the amount of heat supplied to the intake air passing through heat exchanger 85, the position of electronic throttles 44a and 44b, and the amount of boost provided by compressor 81.

Continuing with FIG. 1, engine 10 is shown with an intake camshaft 130 and an exhaust camshaft 132, where camshaft 130 actuates both intake valves 52a,b and camshaft 132 actuates both exhaust valves 54a,b. The valves can be actuated via lift cam profiles on the camshafts (see FIG. 3), where the lift profiles between the different valves may provide varying lift height, lift duration, and/or timing. However, alternative camshaft (overhead and/or pushrod) arrangements could be used, if desired.

Further, lift height, lift duration and/or timing of valves 52a,b and 54a,b can be varied respectively by various valve control devices responsive to signals from controller 12, based on operating conditions. In some embodiments, valve control devices may include a cam profile switching (CPS) device and/or a variable cam timing (VCT) device to provide adjustment of valve operation as will be described below with reference to FIG. 3. These valve/cam control devices may be hydraulically powered, or electrically actuated, or combinations thereof. Signal line 150 can send a control signal to and receive a cam timing and/or cam selection measurement from cam shaft 130. Likewise, signal line 152 can send a control signal to and receive a cam timing and/or cam selection measurement from cam shaft 132.

As described above, FIG. 1 merely shows one cylinder of a multi-cylinder engine, and that each cylinder has its own set of intake/exhaust valves, fuel injectors, spark plugs, etc. However, some or all of the cylinders may share some components such as cam shafts 130 and 132 for controlling valve operation. In this manner, a single cam shaft may be used to control valve operation for two or more cylinders. In an alternative embodiment, a port fuel injection configuration may be used where a fuel injector is coupled to at least one of the intake manifolds for providing port injection, rather than directly to cylinder 30.

Further, in the disclosed embodiments, an exhaust gas recirculation (EGR) system may route a desired portion of exhaust gas from exhaust manifold 48 to at least one of intake manifold 42, 44a, and/or 44b via an EGR valve (not shown). Alternatively, a portion of combustion gases may be retained in the combustion chambers by controlling exhaust valve timing.

Humidity sensing may also be employed in connection with the depicted embodiments. For example, an absolute, or relative, humidity sensor may be used for measuring humidity of the ambient air or intake air. This sensor can be located in one or more of the intake manifolds 42, 44a, or 44b, for example. Also note that humidity may be estimated or inferred based on various operating parameters, such as barometric pressure. Alternatively, humidity can be inferred based on auto-ignition characteristics via adaptive learning. Further, barometric pressure and adaptive learning can be used in combination, and may also be used with sensed humidity values.

Further, combustion sensing may be used in connection with the depicted embodiment. For example, a combustion sensor may be coupled to the cylinder. In one embodiment, a combustion sensor may be a knock sensor coupled to the head of the cylinder. In another embodiment, a knock sensor may be located on the body of the cylinder. In yet another embodiment, a combustion sensor may be a pressure sensor installed inside the cylinder. Information from one or more combustion sensors may determine types/modes of combustion as described below and indicate whether combustion performed is predefined or desired.

The engine 10 may be controlled to operate in various modes, including lean operation, rich operation, and "near stoichiometric" operation. "Near stoichiometric" operation refers to oscillatory operation around the stoichiometric air fuel ratio. Furthermore, the engine may be controlled to vary operation between a spark ignition (SI) mode and a homogeneous charge compression ignition (HCCI) mode. As will be described in more detail below, controller 12 may be configured to cause combustion chamber 30 to operate in these or other modes. Various operating conditions of the engine may be varied to provide different combustion modes, such as fuel injection timing and quantity, EGR, valve timing, valve lift, valve operation, valve deactivation, intake air heating and/or cooling, turbocharging, throttling, etc.

Combustion in engine 10 can be varied by controller 12 depending on operating conditions. In one example, SI mode can be employed where the engine utilizes a sparking device, such as spark plug coupled in the combustion chamber, to regulate the timing of combustion chamber gas at a predetermined time after top dead center of the expansion stroke. In some conditions, during spark ignition operation, the temperature of the air entering the combustion chamber may be controlled to be lower than the temperature of the intake air used for HCCI mode to achieve auto-ignition. While SI combustion may be utilized across a broad range of engine torque and speed it may produce increased levels of NOx and lower fuel efficiency when compared with other types of combustion.

Another type of combustion that may be employed by engine 10 uses HCCI mode, or controlled autoignition (CAI) mode, where autoignition of combustion chamber gases occur at a predetermined point after the compression stroke of the combustion cycle, or near top dead center of compression. Typically, when compression ignition of a premixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

Figure 2:
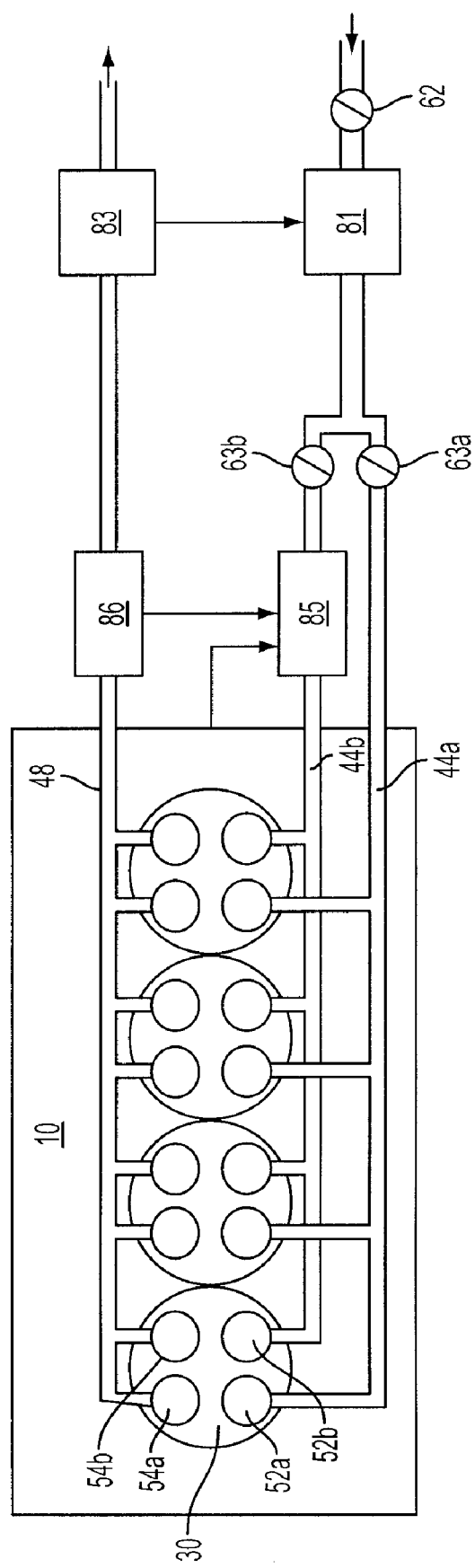
FIG. 2 shows an alternate view the example engine of FIG. 1.

Referring now to FIG. 2, a schematic diagram of engine 10 is shown. In particular, engine 10 is shown having four cylinders; however, it should be appreciated that the engine may include a different number of cylinders. As described above with reference to FIG. 1, combustion chamber 30 is shown having two intake valves 52a and 52b, and two exhaust valves 54a and 54b. Intake manifold 44a is shown communicating with combustion chamber 30 via intake valve 52a and intake manifold 44b is shown communicating with combustion chamber 30 via intake valve 52b. Intake manifolds 44a and 44b are further shown combining upstream of the combustion chamber to form intake manifold 42.

Engine 10 may include one or more throttles. For example, throttle 62 as described above may be used to control the flow of air through intake manifold 42 via controller 12. Similarly, intake manifold 44a may be configured with throttle 63a and intake manifold 44b may be configured with throttle 63b for controlling the flow of intake air to the cylinders. However, in some embodiments, engine 10 may not include one or more of throttles 62, 63a, and 63b. In yet another alternate embodiment, engine 10 may include an independent throttle for each intake valve of one or more cylinders.

Intake manifold 44b may include a heat exchanger 85 that provides heat to air flowing through intake manifold 44b. Heat may be supplied to heat exchanger 85 by one or more sources. For example, heat may be supplied to heat exchanger 85 via heat recovered by heat exchanger 86 arranged in exhaust manifold 48 and/or engine coolant supplied from an engine coolant system. In this manner, combustion chamber 30 may be configured to receive intake air via two sources, each having substantially different temperatures. Engine 10 may further include a compression device such as turbocharger 80. Turbocharger 80 may include a compressor 81 arranged in intake manifold 42 that is powered by turbine 83 arranged in exhaust manifold 48 via shaft 82.

As shown in FIG. 2, each cylinder of engine 10 may be configured to receive intake air via intake manifolds 44a and 44b. Intake air delivered to the combustion chamber via intake manifold 44b may be heated more than the air delivered via intake manifold 44a by varying the amount of heat supplied to intake manifold 44b via heat exchanger 85. In this manner, the intake air supplied via intake manifold 44a may be cooler than the intake air supplied via intake manifold 44b, at least during some conditions.

As described herein, intake manifold 44a may be referred to as the "cold" intake manifold and intake manifold 44b may be referred to as the "hot" intake manifold, although these labels are simply relative. For example, the cold intake manifold (i.e. 44a) may supply intake air that is hotter than the ambient air temperature, but cooler than the intake air provided by the hot intake manifold (i.e. 44b). Further, as described herein, intake valve 52a controlling the amount of air delivered to the combustion chamber via intake manifold 44a may be referred to as the "cold" intake valve and intake valve 52b may be referred to as the "hot" intake valve.

Several approaches may be used to vary the combined temperature of the air delivered to the combustion chamber (i.e. the initial charge temperature). In one approach, the initial charge temperature may be increased by increasing the relative amount of intake air supplied via intake manifold 44b compared to the amount of intake air supplied via intake manifold 44a, while maintaining substantially the same total amount of intake air. For example, the amount of the hotter intake air provided via the hot manifold may be increased and the amount of cooler intake air provided via the cold manifold may be decreased by the same proportion.

In another approach, the initial charge temperature may be increased by increasing the relative amount of intake air supplied via intake manifold 44b compared to the amount of intake air supplied via intake manifold 44a, while varying the total amount of intake air provided to the combustion chamber. For example, the amount of the hotter intake air provided by the hot manifold may be increased more than the amount of the cooler intake air provided by the cold manifold, thereby increasing the temperature of the initial charge temperature while providing a greater total amount of air to the combustion chamber. Alternatively, the amount of the hotter intake air provided by the hot manifold may be decreased less than the amount of the cooler intake air provided by the cold manifold, thereby increasing the temperature of the initial charge temperature while providing less total amount of air to the combustion chamber.

In another approach, the initial charge temperature may be decreased by decreasing the relative amount of hotter intake air supplied via intake manifold 44b compared to the amount of cooler intake air supplied via intake manifold 44a, while maintaining substantially the same total amount of intake air provided to the combustion chamber. For example, the amount of the cooler intake air provided via the cold manifold may be increased and the amount of hotter intake air provided via the hot manifold may be decreased by the same proportion.

In yet another approach, the initial charge temperature may be decreased by decreasing the relative amount of hotter intake air supplied via intake manifold 44b compared to the amount of cooler intake air supplied via intake manifold 44a, while varying the total amount of intake air provided to the combustion chamber. For example, the amount of the cooler intake air provided by the cold manifold may be increased more than the amount of the intake air provided by the hot manifold, thereby decreasing the temperature of the initial charge temperature while providing a greater total amount of air to the combustion chamber. Alternatively, the amount of the cooler intake air provided by the cold manifold may be decreased less than the amount of the intake air provided by the hot manifold, thereby decreasing the temperature of the initial charge temperature while providing less total amount of air to the combustion chamber.

Further, in some approaches, the initial charge temperature may be adjusted by varying the amount of heat supplied to the hot manifold via heat exchanger 85. For example, the initial charge temperature may be increased without necessarily requiring an adjustment to the amount of air supplied via the hot and/or cold manifolds by increasing the amount of heating provided to the hot manifold via the heat exchanger. Alternatively, the initial charge temperature may be decreased without necessarily requiring an adjustment to the amount of air supplied via the hot and/or cold manifolds by decreasing the amount of heating provided to the hot manifold via the heat exchanger.

It should be appreciated that the amount of air delivered via the hot and cold manifolds may be varied by adjusting at least one of valve operation (e.g. lift height, lift duration, valve timing) of intake valves 52a and/or 52b, position of throttles 62, 63a, and/or 63b, and/or the amount of turbocharging provided to the intake manifolds. For example, the amount of air provided to the combustion chamber by an intake manifold may be increased by increasing at least one of lift and/or lift duration for the respective valve. In another example, the amount of air provided to the combustion chamber, for example, by intake manifold 44a may be decreased by adjusting throttle 63a.

Figure 3:
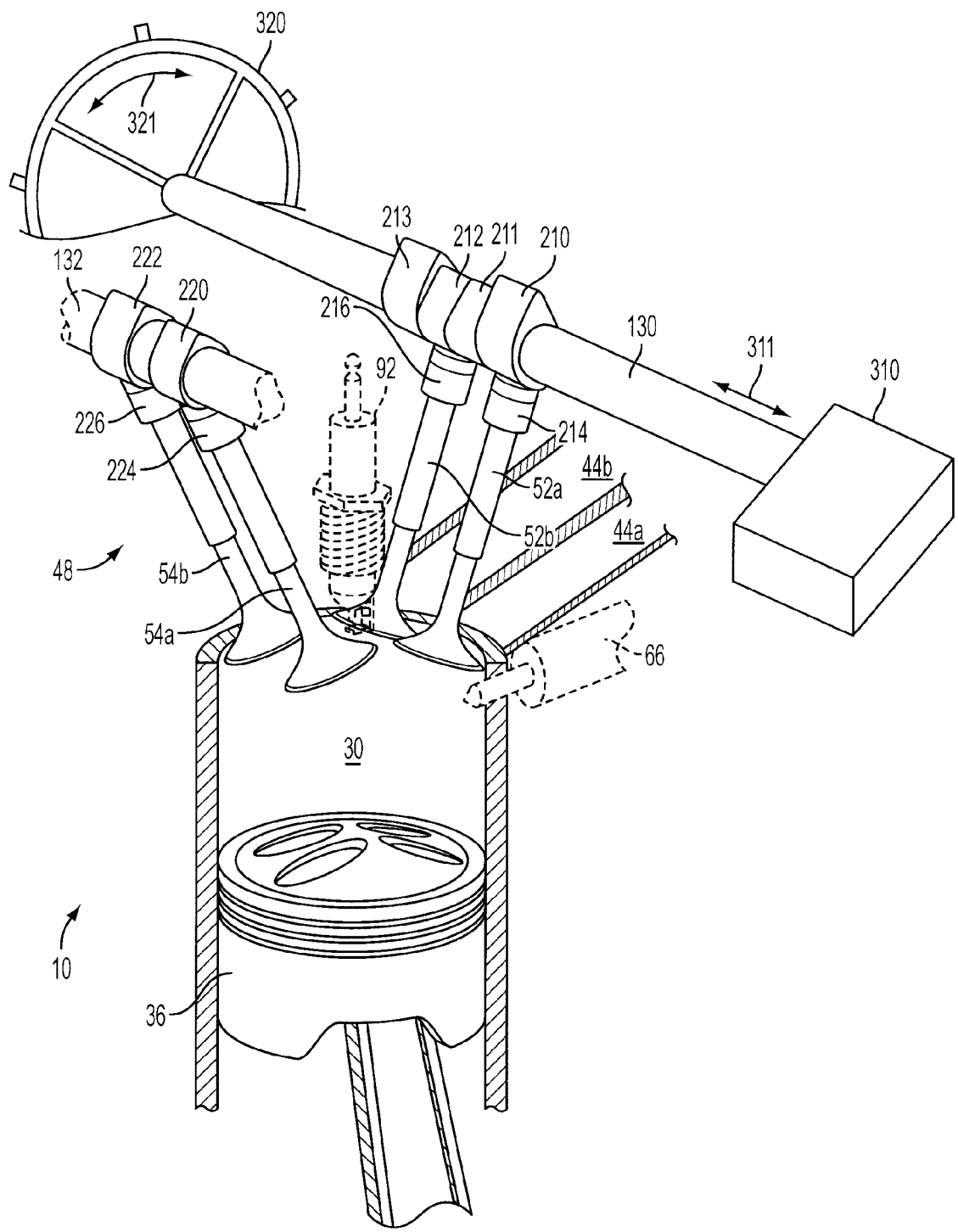
FIG. 3 shows an alternate view of the example cylinder of FIG. 1.

FIG. 3 shows a more detailed schematic view of combustion chamber 30 of engine 10 having piston 36 disposed therein. Combustion chamber 30 is shown communicating with intake manifolds 44a and 44b via intake valves 52a and 52b, respectively. In some embodiments, exhaust valves 54a and 54b may share a common exhaust manifold 48, which has been removed in FIG. 3. Combustion chamber 30 may also include a spark plug 92 and a fuel injector 66A for delivering fuel directly to the combustion chamber. However, in alternate embodiments, the combustion chamber may not include spark plug 92 and/or direct fuel injector 66A.

Further, FIG. 3 shows how intake valves 52a and 52b may be actuated by a common camshaft 130 and exhaust valves 54a and 54b may be actuated by a common camshaft 132. However, in an alternate embodiment, at least one of the intake valves and/or exhaust valves may be actuated by its own independent camshaft or other device. Camshaft 130 is shown including two cam profiles per valve, where intake valve 52a may be actuated by cam lobes having profiles 210 and 211 via tappet 214 and intake valve 54a may be actuated by cam lobes having profiles 212 and 213 via tappet 216. While this example shows an overhead cam engine with a tappet coupled to the valve stems, tappets may also be used with a pushrod engine.

As shown in FIG. 3, cam profile 210 may be larger and thus provides greater lift to valve 52a than cam profile 211. Similarly, cam profile 213 may be larger and thus provide greater lift to valve 52b than cam profile 212. In this manner, shaft 130 may be configured with a cam profile switching (CPS) device 310 that enables camshaft 130 to translate longitudinally, thereby causing operation of intake valve 52a to vary between cam profiles 210 and 211, and intake valve 54a to vary between cam profiles 212 and 213. However, other configurations may be used to enable CPS device 310 to switch valve control between two or more cam profiles. For example, a switchable tappet may be used for varying valve control between two or more cam profiles.

Cam shafts 130 and 132 may also include a variable cam timing (VCT) device 320 configured to vary the timing of valve opening and closing events by varying the relationship between the crank shaft position and the cam shaft position. For example, VCT device 320 may be configured to rotate cam shaft 130 independently of the crank shaft to cause the valve timing to be advanced or retarded. In some embodiments, VCT device 320 may be a cam torque actuated device configured to rapidly vary the cam timing. In some embodiments, valve timing such as IVC may be varied by a continuously variable valve lift (CVVL) device.

While not shown in FIG. 3, in some embodiments, cam shaft 132 may also include a CPS device and/or VCT device for varying the operation of exhaust valves 54a and 54b.

Further, cam profiles 210 and 211 are shown arranged such that as camshaft 130 is translated longitudinally in a first direction (e.g. via the CPS device), cam profiles 210 and 212 may be aligned with the corresponding tappets to control the operation of valves 52a and 52b, respectively. Similarly, as camshaft 130 is translated longitudinally in an opposite direction via the CPS device, cam profiles 211 and 213 control the operation of valves 52a and 52b, respectively. In this manner, when intake valve 52a is operated with cam profile 210 having a higher lift and/or longer lift duration than cam profile 211, intake valve 52b may be operated with cam profile 212 having a lower lift and/or shorter lift duration than cam profile 213. Conversely, when intake valve 52a is operated with cam profile 211 having a lower lift and/or shorter lift duration than cam profile 210, intake valve 52b may be operated with cam profile 213 having a higher lift and/or longer lift duration than cam profile 212. As will be described below in greater detail, this configuration of cam profiles can be used to provide control of the initial combined charge temperature and/or the amount of intake air supplied to the combustion chamber, for facilitating transitions between various modes of operation.

While FIG. 3 is described above with reference to one cylinder of engine 10, it should be appreciated that some or all of the other cylinders may be configured as combustion chamber 30. In some embodiments, depending on engine configuration, some or all of the cylinders of engine 10 may share cam shaft 130 for controlling the intake valves and cam shaft 132 for controlling the exhaust valves. Alternatively, in some embodiments, such as with engines having cylinders arranged in a "V" configuration, a first cam shaft may control the intake valves for a first group or bank of cylinders and a second cam shaft may control the intake valves for a second group of cylinders. In this manner, a single CPS device and/or VCT device may be used to control valve operation of a group of cylinders.

Figure 4:
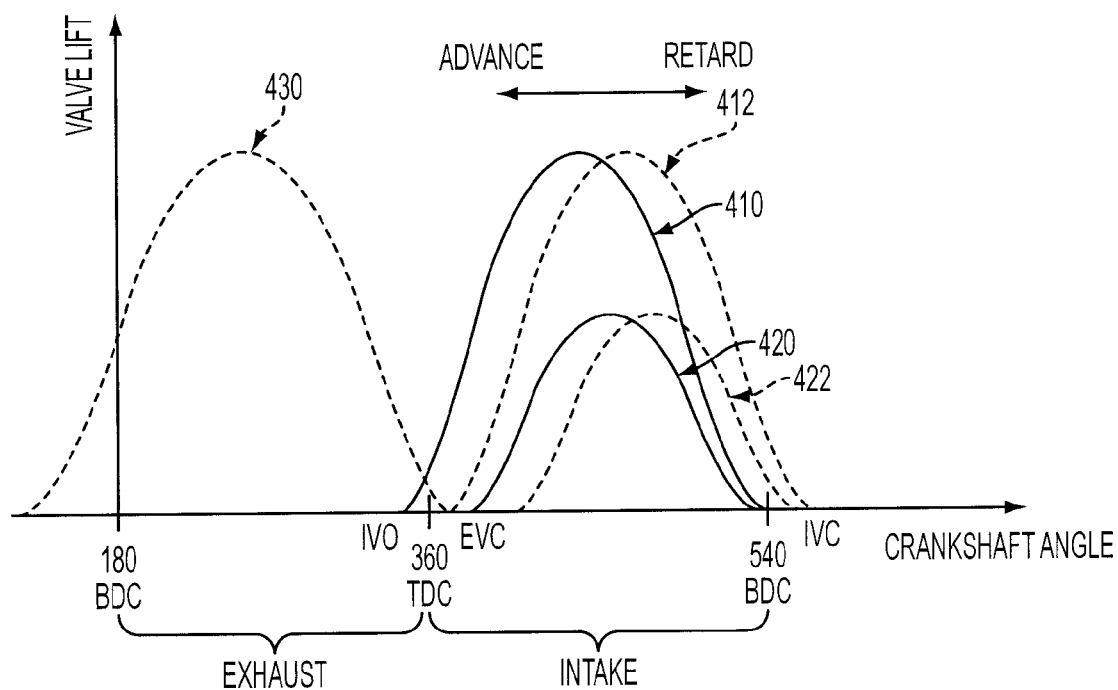
FIGS. 4 and 5 are graphs showing example intake valve operations.
Figure 5:
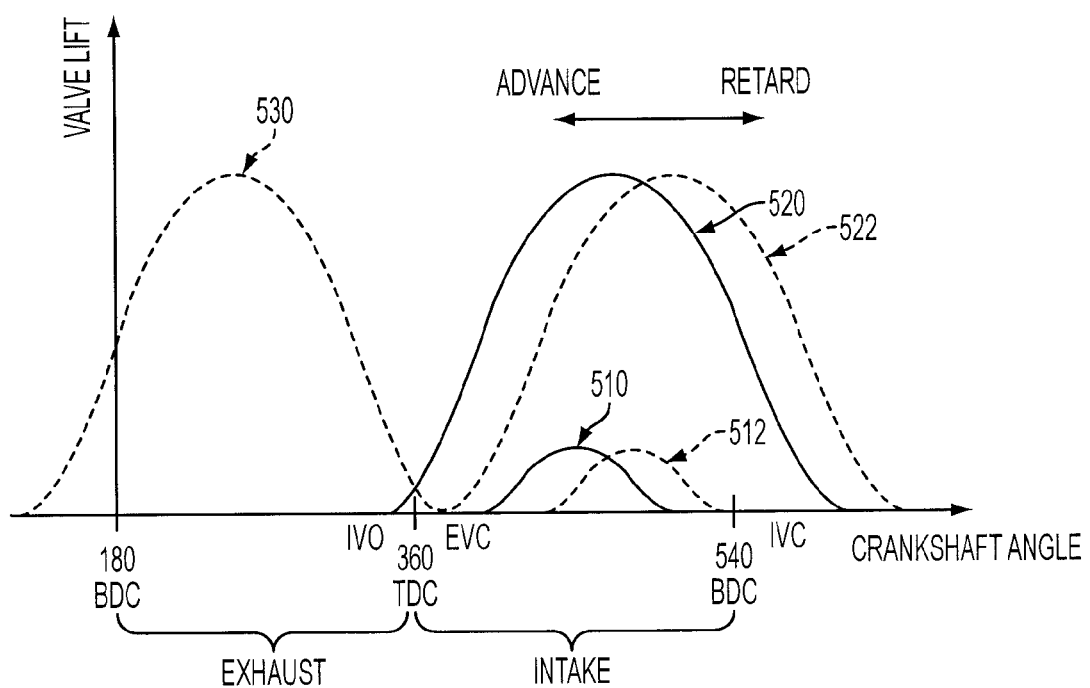

FIGS. 4 and 5 are graphs showing example intake valve operations utilizing the cam profile switching configuration described above with reference to FIG. 3. In particular, FIGS. 4 and 5 show the position of intake valves 52a and 52b with respect to crankshaft angle. The exhaust stroke of the cycle is shown generally occurring between 180 degrees bottom dead center (BDC) and 360 degrees (TDC) crank angle. Subsequently, the intake stroke of the cycle is shown generally occurring between 360 degrees TDC and 540 degrees BDC crank angle.

Further, as shown in FIGS. 4 and 5, a lift of zero or no lift corresponds to a closed position for the intake valves, while a positive lift corresponds to the valve being in an open position, thereby enabling intake air to flow into the combustion chamber. For example, FIG. 4 shows at 410, the lift provided to hot intake valve 52b as controlled by cam profile 213, while at 412, the position of intake valve 52b is shown at a retarded timing relative to 410. The lift provided to cold intake valve 52a as controlled by cam profile 211 is shown, for example, at 420, while the lift provided to intake valve 52a is shown at 422 with a retarded timing relative to 420. Valve timing advance or retard may be provided, for example, by a VCT device described above. Further, an example lift profile provided to the exhaust valves is shown at 430.

In FIG. 4, the hot intake valve 52b is shown having a higher lift and longer lift duration than the cold intake valve 52a. In this condition, the hot intake valve may be referred to as the dominant valve since it may provide the majority of the intake air to the combustion chamber. In this manner, more heated air may be provided to combustion chamber 30 via valve 52b than cooler via valve 52a.

In some examples, the initial temperature of the charge delivered to the combustion chamber may be varied by adjusting the valve/cam timing between the advanced and retarded positions. As will be described below in greater detail, transitions between various modes may also be facilitated by varying the valve/cam timing.

FIG. 5 shows a different selection of cam profiles, for example, as may be performed by the CPS device. For example, the lift provided to hot intake valve 52b as controlled by cam profile 212 is shown at 510, while at 512, the lift provided to intake valve 52b is shown at a retarded timing relative to 510. The lift provided to cold intake valve 52a as controlled by cam profile 210 is shown, for example, at 520, while the lift provided to intake valve 52a is shown at 522 with a retarded timing relative to 520. An example of the lift profile provided to the exhaust valves is shown at 530.

In FIG. 5, the cold intake valve 52a is shown having a higher lift and longer lift duration than the hot intake valve 52b. In this condition, the cold intake valve may be referred to as the dominant valve since it may provide the majority of the intake air to the combustion chamber. In this manner, less heated air may be provided to combustion chamber 30 via valve 52b than cooler air via valve 52a. Furthermore, the low valve lift and/or lift duration provided by cam profile 212 at 510 or 512 may be configured to provide enough air circulation to the combustion chamber so that the air within the hot intake manifold 44b does not become stagnant and cool relative to the desired temperature. In this manner, a ready reserve of heated air may be available for delivery to the combustion chamber.

The example engine configurations described above with reference to FIGS. 1–5 may be used to facilitate transitions between various modes. For example, during operation in HCCI mode, it may be desirable to exercise close control over the timing of autoignition. In contrast to a compression ignition operation of a traditional diesel engine, the start of autoignition is not necessarily initiated by the injection of fuel. Further, a spark is not necessarily performed by a sparking device as may be used with an engine configured for spark ignition. During HCCI, the heat release rate may not be substantially controlled by either the rate or duration of the fuel-injection process, as in a diesel engine, or by the turbulent flame propagation time, as in a spark-ignited engine. Therefore, during HCCI mode, the timing of autoignition may be controlled by varying the charge temperature via cam profile switching and/or variable cam timing, among other control operations.

However, autoignition is a phenomenon that may cause knock. Knock may be undesirable in some engines because it enhances heat transfer within the cylinder and may burn or damage the piston. In HCCI mode, with its high air-to-fuel ratio, knock does not generally cause degradation of the engine because the diluted charge reduces the rate of pressure rise and the maximum temperature of the burned gases. The lower rate of pressure rise mitigates the damaging pressure oscillations characteristic of spark ignition knock.

In comparison to a spark ignition engine, the temperature of the charge at the beginning of the compression stroke typically may be increased to reach autoignition conditions at or near the end of the compression stroke (e.g. around 360 degrees TDC). It will be appreciated by those skilled in the art that numerous other methods may be used to elevate initial charge temperature. For example, the heat exchanger configured to provide thermal energy to the hot intake manifold may be used to elevate the intake air temperature. Some other methods may include: keeping part of the warm combustion products in the cylinder (internal EGR) by adjusting intake and/or exhaust valve timing, compressing the inlet charge (turbocharging or supercharging), changing the autoignition characteristics of the fuel provided to the engine, and/or heating the intake air charge (external EGR).

During HCCI combustion, autoignition of the combustion chamber gas may be controlled to occur at a desired position of the piston or crank angle to generate desired engine torque, and thus it may not be necessary to initiate a spark from a sparking device to achieve combustion. However, a late spark timing, after an autoignition temperature should have been attained, may be utilized as a backup ignition source in the case that autoignition does not occur, thereby reducing misfire.

As described above, engine 10 may be configured to operate in a plurality of modes. In some embodiments, engine 10 may be configured to selectively vary operation between SI mode and HCCI mode by utilizing the intake valve control methods described above with reference to FIGS. 4 and 5. For example, the intake valve operation shown in FIG. 4 may be used during HCCI mode to provide an initial air charge having a higher temperature for enabling autoignition. During SI mode, the intake valve operation shown in FIG. 5 may be used to provide decreased heating, thereby reducing engine knock and increasing efficiency during SI operation. However, in some embodiments, as shown at 510 in FIG. 5, hot intake valve 52b may be controlled so that at least some heated air is allowed to flow to the combustion chamber, thereby reducing stagnation within the hot manifold and maintaining a ready reserve of heated air. Transitions between HCCI mode and SI mode may be performed by at least operating the CPS device to vary the intake valve operation between FIG. 4 and FIG. 5, respectively.

The cam profiles 210, 211, 212, and 213 described above with reference to FIG. 3 may be configured such that the compression ratio of the combustion chamber is varied when the cam profiles are switched. For example, when switching from the valve operation of FIG. 4 to the valve operation of FIG. 5, the effective compression ratio may be reduced due to late IVC from approximately 15:1 to approximately 10:1, which would reduce the amount of air delivered to the combustion chamber by approximately a third (⅓). Thus, if the combustion chamber was running at an air/fuel ratio of 30 in HCCI mode, after the cam profiles are switched from 211 and 213 to 210 and 212 for SI mode, the air/fuel ratio would be reduced to approximately 20 for the same amount of fuel and torque. Thus, the generally higher air/fuel ratio used during HCCI mode may be to the generally lower air/fuel ratio used during SI mode by switching cam profiles. In this manner, the cam profile switching operation may be used to concurrently vary the charge temperature and the air/fuel ratio. However, it should be appreciated that other cam profiles may be used to provide other changes in compression ratio and/or air/fuel ratio. For example, the cam profiles may be configured to provide more or less change in the effective compression ratio and/or air/fuel ratio. Alternatively, the cam profiles may be configured to provide no change in compression ratio and/or air/fuel ratio (e.g. if cam profiles 210 and 212 are of similar shape, and cam profiles 211 and 213 are of similar shape).

Thus, in some conditions, selection of appropriate cam profiles may be used for enabling the VCT device to provide smoother transitions and reduced noise and vibration harshness (NVH). In some embodiments, cam profiles 213 and 211, which may be used during operation in HCCI mode, may be configured to respectively close intake valves 52b and 52a before bottom dead center (BDC) of piston position for fully advanced intake cam timing, with the cold intake valve 52a closing before the hot intake valve 52b as shown in FIG. 4. The resulting trapped volume and hence, the air-charge and effective compression ratio may be relatively insensitive to cam timing with intake valve closing around top dead center (TDC) of piston position, wherein the valve closing timing may be adjusted (i.e. pre-positioned for a transition to SI mode) without greatly impacting HCCI combustion via autoignition.

Figure 6:
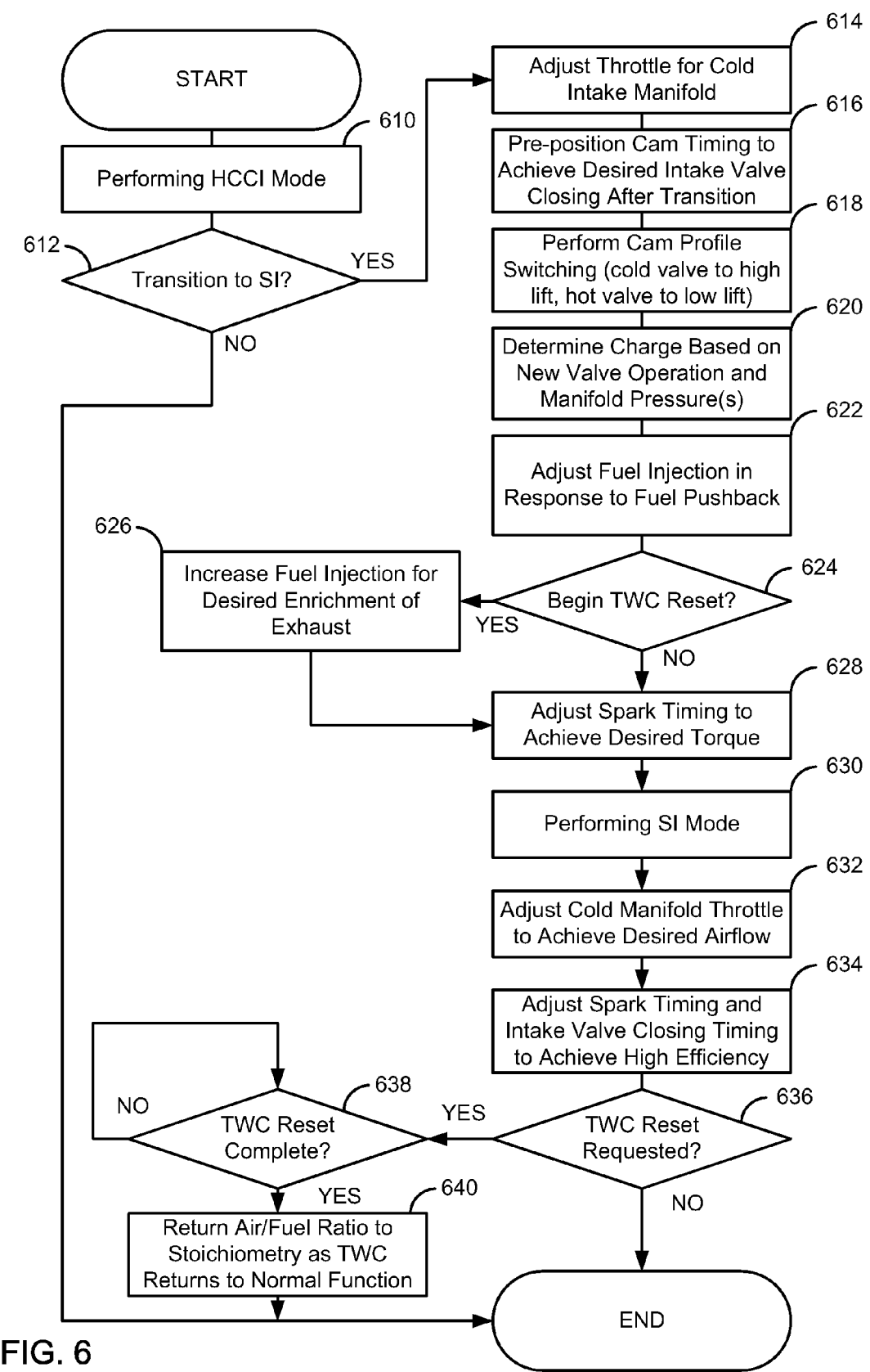
FIGS. 6 and 7 show example flow charts describing control routines for performing mode transitions.
Figure 7:
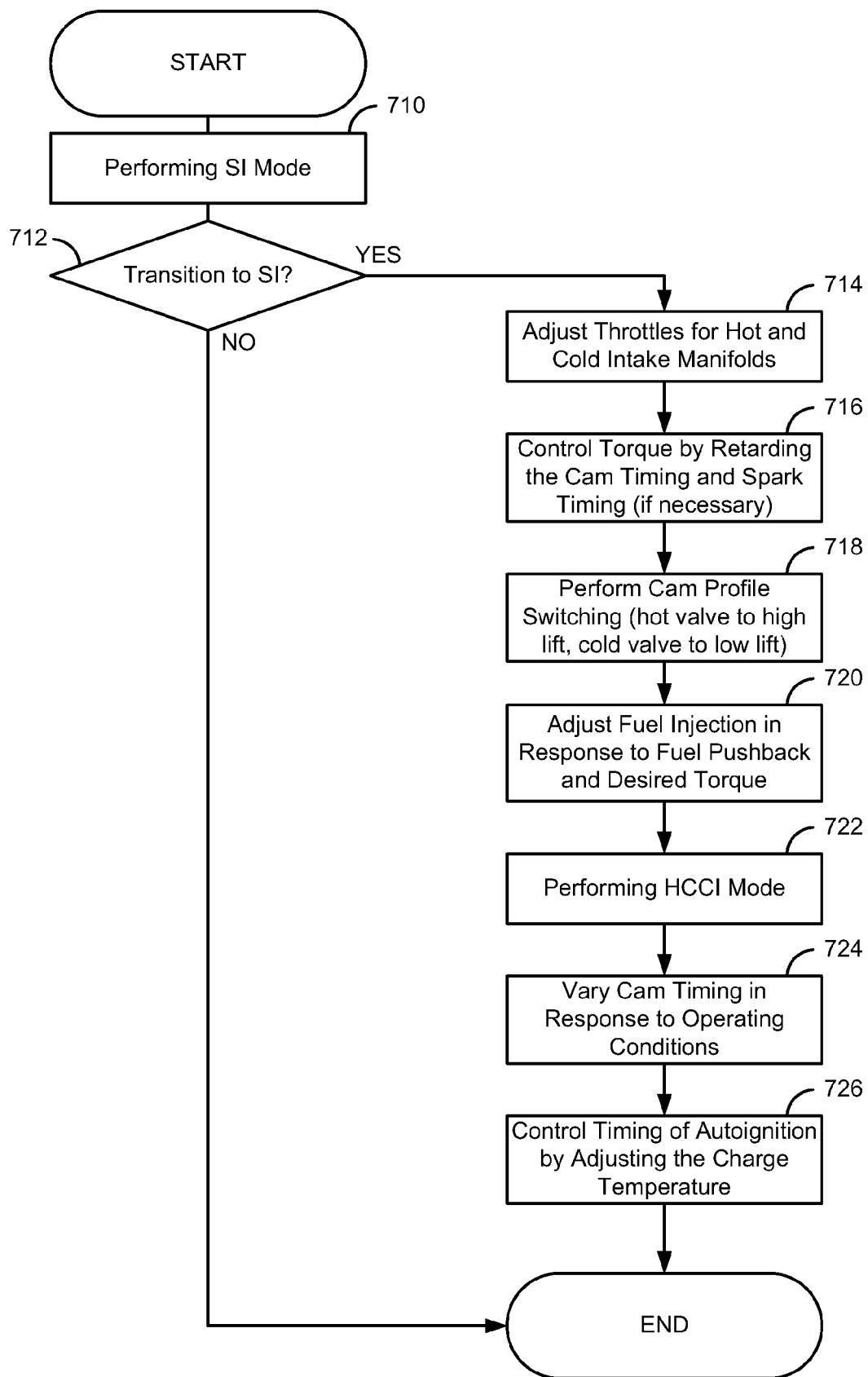

FIGS. 6 and 7 are flowcharts describing example routines for performing transitions between SI mode and HCCI mode. These routines generally seek to reduce and/or minimize disturbances such as torque fluctuations and/or NVH as a result of transitions between these combustion modes.

In particular, FIG. 6 describes an example routine for performing a transition from HCCI mode to SI mode with the example configuration of engine 10 as described above with reference to FIGS. 1–5. While the various control methods described herein for facilitating transitions from HCCI mode to SI mode are on an individual cylinder basis, it should be appreciated that these methods may be similarly applied to some or all of the engine cylinders. Beginning at 610, the combustion chamber is initially operating in HCCI mode, where it may be judged at 612 whether a transition to SI mode is requested. If the answer is no, the routine may end or alternatively, the control system may continuing monitoring the engine for conditions that where a transition is desirable. Instead, if the answer at 612 is yes, the control system may adjust at least one of the throttles controlling the air flow through the cold intake manifold (e.g. throttle 63a and/or 62) at 614. For example, the control system may use throttling of the cold air manifold via throttle 63a and/or throttle 62 to reduce the amount of air supplied to the cylinder in anticipation of a transition to SI mode.

Further, the control system may pre-position the cam timing at 616 to achieve the desired intake valve closing after the transition. For example, the VCT device may be controlled to retard the intake valve operation as shown in FIG. 4 at 412 and 422. Next, the control system may command the CPS device to switch between the cam profiles controlling the intake valves at 618. For example, cam profiles 213 and 211 controlling valves 52b and 52a respectively, may be switched to cam profiles 212 and 210, respectively. Thus, operation of the intake valves may be varied from the operation shown in FIG. 4 to the operation of FIG. 5.

Further, the control system may determine at 620, the new air charge based on the new valve operation and/or the pressure(s) detected in one or more of the intake manifolds. Next, the fuel injection may be adjusted in response to fuel pushback from the previous early intake valve closing and the new late intake valve closing settings. In some conditions, the fuel amount needed during the first cycle after the cam profile switch may be approximately 50% larger than in subsequent cycles. Thus, the control system may vary the amount of fuel delivered to the combustion chamber in response to a determination of the fuel pushback and/or desired torque.

In some conditions, the fuel injected may be further adjusted responsive to a three-way catalyst (TWC) reset request. For example, at 624 it may be judged before or during the transition whether to begin a TWC reset. If the answer is yes, the control system may further increase the fuel delivered to the combustion chamber at 626 to achieve the desired enrichment of the exhaust. Alternatively, if the answer at 624 is no, the routine may proceed directly to 628. At 628, the control system may adjust the spark timing to achieve the desired torque. For example, spark timing retard may be used to reduce the torque produced by the engine.

In some embodiments, the transition between HCCI and SI may occur subsequent to the cam profile switch with the initiation of a spark performed by a sparking device. However, in some embodiments, HCCI may utilize an assist spark prior to the cam profile switch to initiate autoignition or to reduce misfire. Therefore, the initiation of SI mode may be generally characterized by the use of an ignition spark to achieve combustion, reduction of charge temperature, abandonment of controlled autoignition, and an enrichment of the charge (i.e. reduced air/fuel ratio).

As SI mode is initiated at 630 by at least one spark performed during the cycle to initiate combustion of the charge, the cold manifold throttle 63a may be adjusted to achieve the desired airflow at 632. Thus, during SI mode, the torque produced by the cylinder undergoing the transition may be controlled by varying the cold manifold throttle. For example, torque may be reduced by increasing throttling or alternatively, torque may be increased by decreasing throttling of the intake manifold. Further, in some embodiments, the cold manifold throttle may be varied responsive to a gradual heating of the combustion chamber walls after the transition to SI mode is performed and/or as the manifold pressure continues to vary. As the cold manifold throttle takes over control of the cylinder the spark timing and intake valve timing may be adjusted at 634 to achieve high efficiency. For example, if spark timing retard or cam timing retard was used during the transition, then the spark timing and/or cam timing may be advanced over one or more cycles to a timing that provides improved efficiency for the particular operating conditions. In some embodiments, the spark timing and intake valve closing may also be varied responsive to the gradual heating of the combustion chamber walls in SI mode and/or transient manifold pressure.

At 636 it may be judged whether the TWC reset operation was requested at 624. If the answer is yes, it may be judged at 638 whether the TWC is complete. If the answer at 638 is yes, then at 640 the air/fuel ratio may be returned to approximately stoichiometry as the TWC returns to a normal function. Alternatively, if the answer at 638 is no, the routine may return to 638 until the reset is complete. The air/fuel ratio may be varied by varying valve timing, the position of one or more throttles, and/or the amount of fuel delivered to the combustion chamber. For example, the amount of fuel injected during each cycle may be reduced after reset of the TWC is complete. Alternatively, if the answer at 636 is no, the routine may end.

In summary, FIG. 6 provides a method for transitioning at least one cylinder of the engine from HCCI mode to SI mode. This method generally includes the pre-positioning of the intake valve closing events by varying the valve timing prior to the transition, performing a switch of the intake cam profiles, and gradually restoring operation in SI mode as variables such as manifold pressure and cylinder wall temperature transition from the previous mode conditions.

One example of an application involving at least the two combustion modes presented above may include the use of SI for startup and/or after engine startup during an engine warming period. After such engine startup and engine warming, the combustion process may transition to HCCI mode for improved fuel economy and emissions. During periods of high engine torque requirements, the engine may transition one or more cylinders to SI mode or may utilize a spark assist operation to ensure proper autoignition timing in HCCI mode. As the engine is returned to a low or moderate torque requirement, the cylinders may be transitioned back to HCCI mode and/or the involvement of spark assist may be discontinued in order to realize the full benefits of HCCI. While one or more of the above combustion modes may be used in some examples, still other combustion modes may be used, such as stratified operation, either with or without spark initiated combustion.

FIG. 7 describes an example routine for performing a transition from SI mode to HCCI mode with the example configuration of engine 10 as described above with reference to FIGS. 1–5. Some of the issues in transitioning from SI mode to HCCI mode may include hotter cylinder walls from SI mode heating the charge in HCCI mode, which may result in preignition and/or knock, lower cold intake manifold pressure (which may also result in a higher than desired air charge temperature after the cam profile switch), and the reduced effectiveness of a spark to control the timing of combustion. Another issue is the potential presence of a substantial amount of fuel pushed back from the previous cycle in SI mode. While the various control methods described herein for facilitating transitions from SI mode to HCCI mode are on an individual cylinder basis, it should be appreciated that these methods may be similarly applied to some or all of the engine cylinders. Beginning at 710, the combustion chamber is initially operating in SI mode, where it may be judged at 712 whether a transition to HCCI mode is requested. If the answer at 712 is no, then the routine may end. Alternatively, if the answer at 712 is yes, then the control system may perform control operations 714–724 to achieve the desired transition.

Prior to the cam profile switch, the control system may adjust the throttles of the hot and cold intake manifolds at 714, while taking into account the higher cylinder wall temperature from prior operation in SI mode. For example, the control system may increase the opening of throttles 63a and/or 63b so that the pressure in the cold intake manifold 44a and/or the hot intake manifold 44b may be increased, respectively. The control system may control the torque produced by the cylinder by varying the cam timing and/or spark timing at 716. For example, the control system may retard the cam timing and/or spark timing to reduce the torque prior to, during, and/or after the cam profile switch has been performed.

At 718, the control system may command the CPS device to switch cam profiles. For example, cam profile 212 providing low lift to hot intake valve 52b may be switched to cam profile 213 providing higher lift and cam profile 210 providing high lift to cold intake valve 52a may be switched to cam profile 211 providing lower lift. In this manner, intake valve control may be varied from the operation shown in FIG. 5 to the operation shown in FIG. 4.

After the cam profile switch has been performed, at 720, the control system may adjust the fuel to be injected taking into account the difference in the amount of pushback fuel from the previous late intake valve closing settings of the intake valves. The cold manifold port mixture may include the fuel amount pushed back during the previous cycle in SI mode. The control system may further vary the fuel to be injected in the subsequent cycles after the switch in response to the desired torque, which may include adjustment of injection amount and/or injection timing. As the first fuel injection is performed after the cam profile switch and the charge is compressed so that autoignition occurs, HCCI mode has been achieved at 722. In some embodiments, the control system may continue utilizing at least one spark per cycle even after the cam profile switch has been performed to control the timing of autoignition and/or to ensure autoignition occurs. As autoignition timing is stabilized and the transition to HCCI mode has occurred, the spark may be optionally discontinued to achieve the full benefits of HCCI.

The control system may vary the cam timing over one or more cycles after the switch in response to operating conditions of the engine at 724. For example, the control system may advance the timing of the cam timing from its retarded position selected prior to the cam profile switch. The timing of combustion by autoignition may be further controlled by adjusting the temperature of the air charge at 726. For example, by increasing or decreasing the charge temperature, the timing of autoignition may be advanced and retarded, respectively. The charge temperature may be varied by adjusting one or more of the cam timing, turbocharging, EGR, throttle position, heat exchanger settings, etc.

In summary, FIG. 7 provides a method for transitioning at least one cylinder of the engine from SI mode to HCCI mode. This method generally includes the pre-positioning of the intake valve closing events by varying the valve timing prior to the transition, performing a switch of the intake cam profiles from high to low lift for the cold intake valve and low to high lift for the hot intake valve, and gradually restoring operation in HCCI mode as variables such as manifold pressure, cylinder wall temperature, and/or fuel pushback vary over one or more cycles from the previous mode conditions.

In some conditions, operation in SI mode may generate higher cylinder wall temperatures than operation in HCCI mode. Transitions between SI and HCCI modes may therefore result in the cooling or heating of the cylinder walls, which may occur over one or more cycles after the transition.

Figure 8A:
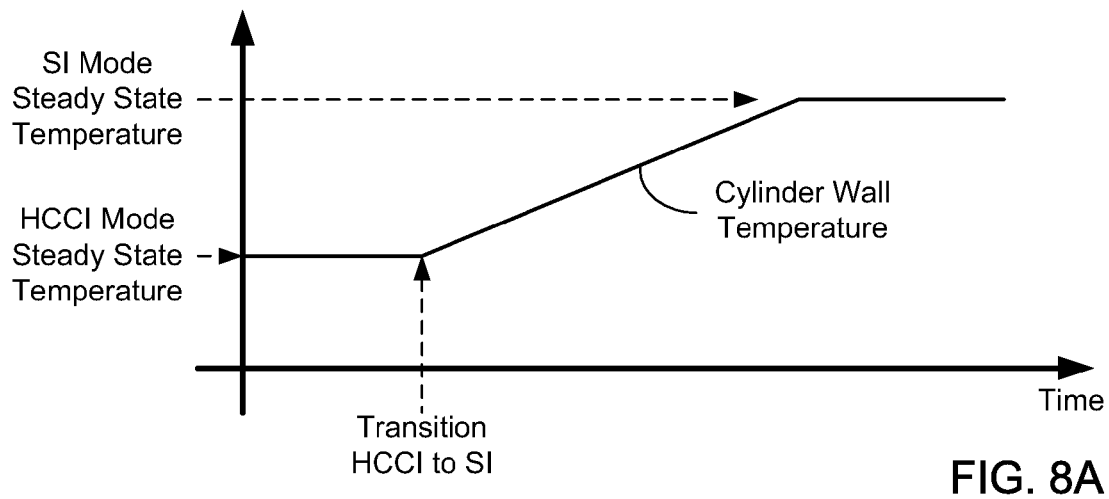
FIGS. 8A, 8B, and 8C show graphs of cylinder wall temperature for different control scenarios.
Figure 8B:
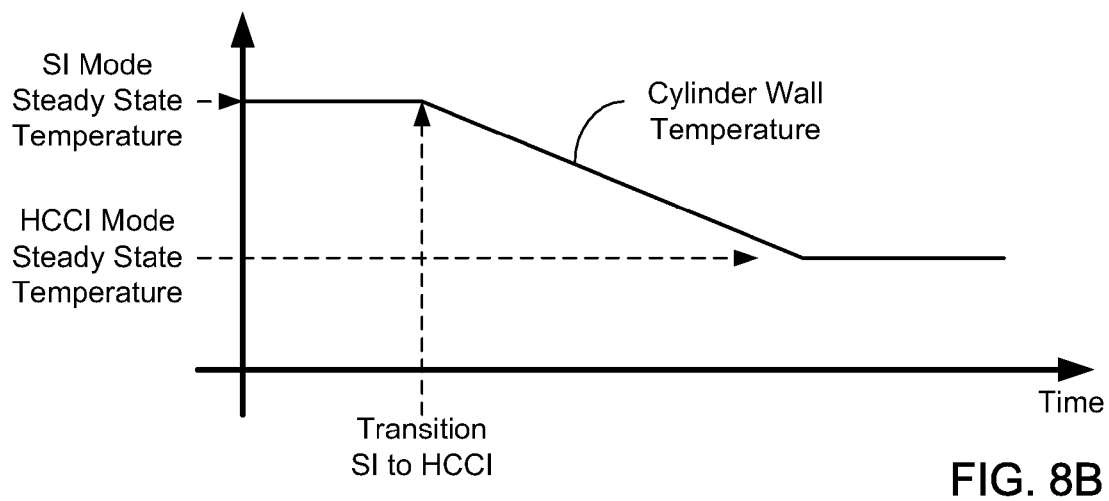
Figure 8C:
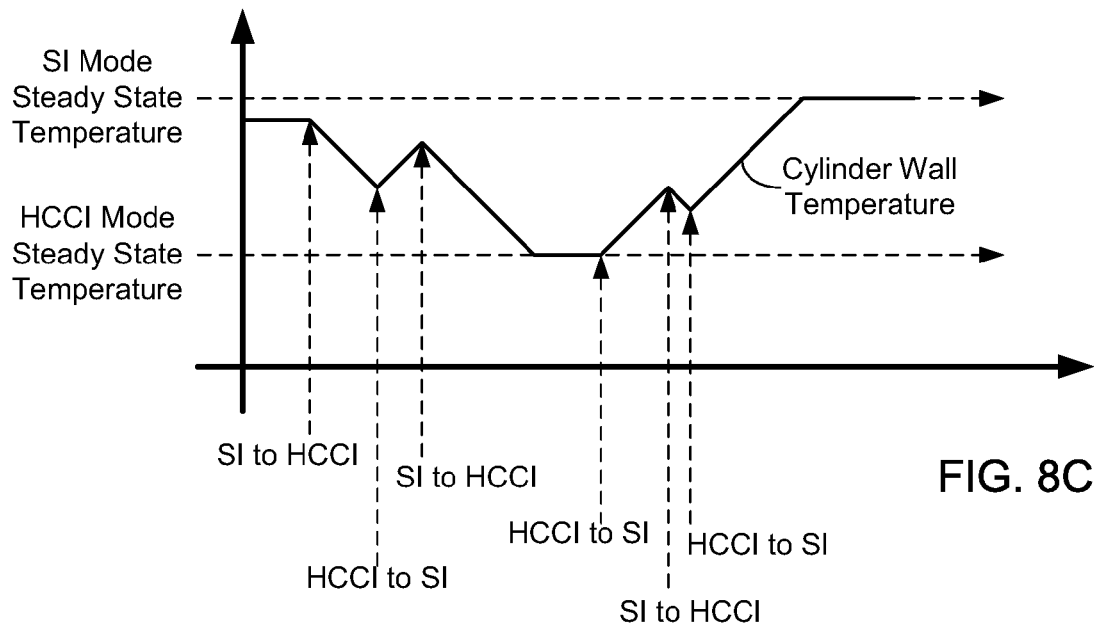

FIGS. 8A, 8B, and 8C show graphs of cylinder wall temperature compared to time for example scenarios involving transitions between SI and HCCI modes. For example, FIG. 8A shows the temperature of a particular portion of the example cylinder wall for HCCI mode, SI mode, and a transition there between. The cylinder is shown initially operating in HCCI mode, wherein the wall temperature is at an approximately steady state temperature or thermal equilibrium. At a later time, the cylinder is transitioned from HCCI mode to SI mode, wherein the cylinder wall temperature is shown to increase with time until reaching a second higher steady state temperature in SI mode. While the cylinder wall temperature is shown to increase linearly in FIG. 8A, the cylinder wall temperature may alternatively increase non-linearly in some examples.

FIG. 8B shows the temperature of a particular portion of the example cylinder wall for SI mode, HCCI mode, and a transition there between. The cylinder is shown initially operating in SI mode, wherein the wall temperature is at an approximately steady state temperature or thermal equilibrium prior to a transition to HCCI mode. At a later time, the cylinder is transitioned from SI mode to HCCI mode, wherein the cylinder wall temperature is shown to decrease with time until reaching a second lower steady state temperature in HCCI mode. While the cylinder wall temperature is shown to decrease linearly in FIG. 8B, the cylinder wall temperature may alternatively decrease non-linearly in some examples.

During actual operation of the engine, the cylinder wall temperature may vary between the higher wall temperature in SI mode and the lower wall temperature of HCCI mode. For example, FIG. 8C shows the temperature of a particular portion of the example cylinder wall during an example engine operation. The cylinder is shown initially operating in SI mode. At a later time, the cylinder is transitioned from SI mode to HCCI mode, wherein the cylinder wall temperature is shown to decrease with time until a transition from HCCI mode to SI mode is performed. During SI mode, the cylinder wall temperature is shown to increase with time until a second transition from SI mode to HCCI mode is performed, wherein the temperature may again decrease in HCCI mode until reaching a state of thermal equilibrium.

Therefore, in some embodiments, the control system may adjust one or more operating conditions of the cylinder responsive to the cylinder wall temperature. For example, the control system may be configured to vary valve timing, EGR amount, turbocharging, spark timing, intake air temperature, heat exchanger conditions, throttle position and/or various other engine operating conditions responsive to an estimation and/or measurement of the cylinder wall temperature.

Figure 9:
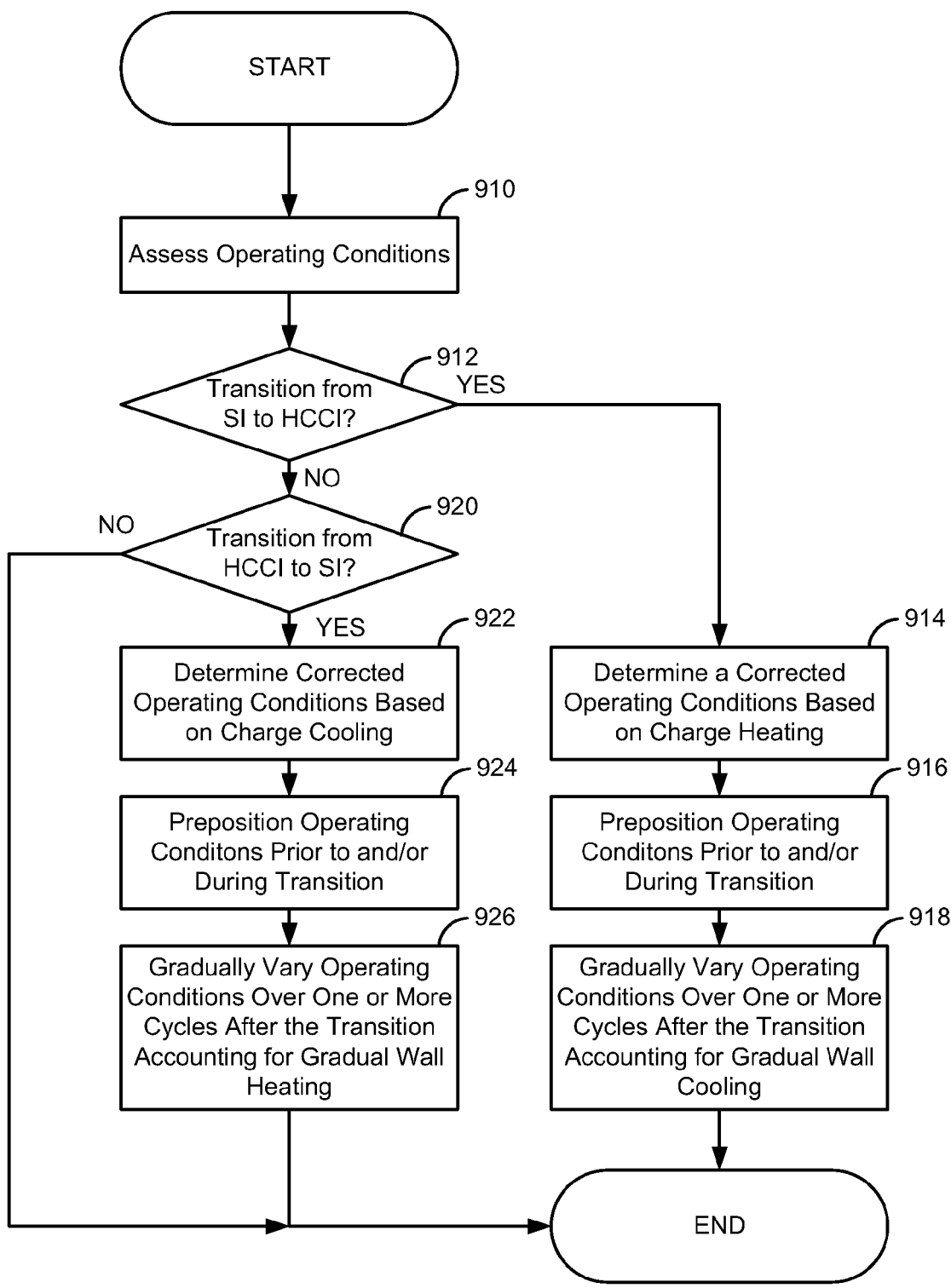
FIG. 9 shows an example flow chart describing a control routine for adjusting initial charge temperature of the cylinder responsive to the cylinder wall temperature.

FIG. 9 shows an example routine for varying the initial charge temperature of the combustion chamber responsive to cylinder wall temperature. Beginning at 910, the control system may assess the operating conditions of the cylinder. This assessment may include at least a determination of the cylinder wall temperature via measurement and/or estimation. In some embodiments, the control system may estimate the cylinder wall temperature based on the duration of the previous combustion mode(s) and/or past engine output (e.g. speed, load, torque, etc.). For example, if the cylinder was operating in SI mode for an extended period of time, then the temperature of the cylinder wall may be higher than if the cylinder was operating in SI mode for a shorter duration.

At 912, the control system may determine whether a transition from SI to HCCI is requested. If the answer is yes, at 914, the control system may determine corrected operating conditions based on an estimation of the amount of charge heating provided by the cylinder walls. For example, the cylinder may have been operating in SI mode for a substantial period of time prior to the transition, which may result in a higher cylinder wall temperature. The control system may then correct one or more operating conditions such as the position of the hot and/or cold throttles, the cam timing, valve timing, amount of fuel injected, and/or spark timing so that the desired autoignition timing is achieved after the transition. If the control system were to ignore the affects of charge heating by the cylinder walls, the timing of autoignition may occur earlier than desired, potentially resulting in a torque fluctuation and/or knock.

At 916, the control system may vary one or more operating conditions prior to and/or during the transition from SI mode to HCCI mode. For example, the valve timing, EGR, throttle position, etc. may be adjusted to vary the intake air temperature forming the initial charge. Further, at 918, after the transition from SI mode to HCCI mode has been completed, the control system may continue varying the operating conditions of the cylinder over one or more cycles as the cylinder wall temperature tends toward thermal equilibrium. For example, the control system may supply more cool air to the combustion chamber right after a transition from SI mode to HCCI mode to reduce the likelihood of preignition or autoignition timing occurring too early. As the cylinder wall temperature and therefore the charge heating provided by the cylinder walls gradually decreases, the initial intake air temperature may be gradually increased via throttle control to achieve the desired autoignition timing.

Alternatively, if the answer at 912 is no, the routine may proceed to 920, where it may be judged whether a transition from HCCI mode to SI mode is requested. If the answer at 920 is no, the routine may end. Alternatively, if the answer at 920 is yes, the control system may determine corrected operating conditions based on an estimation of the amount of charge cooling provided by the cylinder walls at 922. At 924, the control system may adjust one or more operating conditions such as adjusting the position of the hot or cold throttles, cam timing, valve timing, amount of fuel injected and/or spark timing prior to and/or during the transition responsive to the corrected initial charge temperature determined at 922. At 924, the control system may continue varying the operating conditions for one or more cycles after the transition to SI mode responsive to the gradual wall heating. For example, the control system may gradually vary one or more operating conditions responsive to an increase in the cylinder wall temperature as the cylinder wall temperature tends toward thermal equilibrium. In some embodiments, it may be possible to utilize more turbocharging after a transition without causing knock, since some charge cooling may be provided by the cylinder walls.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine having at least one cylinder, comprising:
   directing a first air stream to a first intake valve of the cylinder;
   directing a second, separate, air stream to a second intake valve of the cylinder, said first stream at a higher temperature than said second air stream;
   during a first mode, operating with said first intake valve providing more airflow than the second intake valve;
   varying a timing of at least one of the first and the second intake valves during the first mode when transitioning to a second mode; and
   during the second mode, operating with said first intake valve providing less airflow than the second intake valve, and varying a timing of at least one of the first and second intake valves after transitioning from the first mode.

2. The method of claim 1 wherein during said first mode, the first intake valve has a higher maximum lift than said second intake valve, and during said second mode, the first intake valve has a lower maximum lift than the second intake valve.

3. The method of claim 1, wherein said timing includes a timing of at least one of an opening event and a closing event of at least one of the first and the second intake valves.

4. The method of claim 1, wherein said timing is varied during the first mode by advancing an action performed by at least one of the first and the second intake valves and said timing is varied during the second mode by retarding an action performed by at least one of the first and the second intake valves.

5. The method of claim 1, wherein said timing is varied during the first mode by retarding an action performed by at least one of the first and the second intake valves and said timing is varied during the second mode by advancing an action performed by at least one of the first and the second intake valves.

6. The method of claim 5, wherein the first mode is a homogeneous charge compression ignition mode and the second mode is a spark ignition mode.

7. The method of claim 6, wherein the amount of fuel injected into the cylinder is reduced for the first cycle in the first mode and wherein the amount of fuel injected into the cylinder after the first cycle is increased over subsequent cycles in the first mode.

8. The method of claim 1, wherein the timing of at least one of the first and the second intake valves is varied to regulate torque produced by the engine, and spark timing is further varied during at least one of the first and second modes to suppress torque fluctuations of the transition.

9. The method of claim 1, further comprising during the first mode, operating with said first intake valve having longer lift duration than said second intake valve and during the second mode, operating with said first intake valve having a shorter lift duration than said second intake valve.

10. The method of claim 1, wherein the engine further includes a first throttle located upstream of the cylinder configured to vary the first air stream and a second throttle located upstream of the cylinder configured to vary the second air stream, and wherein the method further comprises adjusting at least one of the first and the second throttles when transitioning between the first and the second modes.

11. The method of claim 10, wherein at least the second throttle is adjusted to reduce the second air stream when operation of the cylinder is varied from the first mode to the second mode.

12. A method of operating an engine having at least one cylinder, comprising:
   directing a first air stream to a first intake valve of the cylinder;
   directing a second, separate, air stream to a second intake valve of the cylinder, said first stream at a higher temperature than said second air stream;
   during a compression ignition mode, operating with said first intake valve providing more airflow than the second intake valve;

varying a timing of at least one of the first and the second intake valves during the compression ignition mode when transitioning to a spark ignition mode;

during the spark ignition mode, operating with said first intake valve providing less airflow than the second intake valve, and varying a timing of at least one of the first and second intake valves after transitioning from the compression ignition mode; and varying an amount of fuel delivered to the cylinder during the transition in response to the varied timing.

13. The method of claim 12, wherein during a transition from the spark ignition mode to the compression ignition mode, the amount of fuel delivered to the cylinder is substantially decreased for the first cycle where the compression ignition mode is performed, and the amount of fuel delivered to the cylinder is increased over at least one cycle after the first cycle.

14. The method of claim 12, wherein during a transition from the compression ignition mode to the spark ignition mode, the amount of fuel delivered to the cylinder is substantially increased for the first cycle where the spark ignition mode is performed, and the amount of fuel delivered to the cylinder is decreased over at least one cycle after the first cycle.

15. The method of claim 12, further comprising adjusting at least one throttle located upstream of the cylinder to adjust the proportion of at least one of the first and the second air streams.

16. The method of claim 12, further comprising retarding at least one of the first and the second valve timings during the compression ignition mode.

17. The method of claim 12, further comprising varying a timing of a spark performed within the cylinder to control the amount of torque produced by the cylinder during the transition.

18. The method of claim 12, wherein the operation of the first intake valve and the operation of the second intake valve are varied by a cam profile switching system.

19. The method of claim 12, wherein an operation of at least one of the first and the second intake valves is varied over a plurality of cycles responsive to cylinder wall temperature after the transition is performed.

20. A method for transitioning at least one cylinder of an engine from a spark ignition mode and to a homogeneous charge compression ignition mode, comprising:

increasing an amount of a first air stream admitted to the cylinder via a first valve;

decreasing an amount of a second air stream admitted to the cylinder via a second valve wherein the temperature of the first air stream is higher than the second air stream;

reducing an amount of fuel delivered to the cylinder responsive to a timing of the at least one of the first and the second valves.

21. The method of claim 20, wherein a valve timing of the first and the second valves is varied in a first direction over at least one cycle before the transition and varied in a second direction opposite the first direction over at least one cycle after the transition.

* * * * *